United States Patent [19]

Roth

[11] 4,285,470
[45] Aug. 25, 1981

[54] SELF-CONTAINED HEADLAMP WASHER SYSTEM

[75] Inventor: David W. Roth, Detroit, Mich.
[73] Assignee: The 2500 Corporation, Lathrup Village, Mich.
[21] Appl. No.: 63,473
[22] Filed: Aug. 3, 1979
[51] Int. Cl.³ .............................. B05B 1/10; B60S 1/52
[52] U.S. Cl. ................................ 239/284 A; 15/250 A
[58] Field of Search ........................ 239/284 A, 284 R; 15/250 A

[56] References Cited

U.S. PATENT DOCUMENTS

| | | | |
|---|---|---|---|
| 3,469,088 | 9/1969 | Coleman | 239/284 A |
| 3,574,337 | 4/1971 | Edwards | 239/284 A |
| 3,915,385 | 10/1975 | Hassinger | 239/284 A |
| 4,088,358 | 5/1978 | Hirsch | 239/284 A |

FOREIGN PATENT DOCUMENTS 2125259  12/1971  Fed. Rep. of Germany ...... 239/284 A Primary Examiner—Richard A. Schacher
Attorney, Agent, or Firm—Dolgorukov and Dolgorukov

[57] ABSTRACT

The specification discloses a self-contained headlamp washer system which consists of an electrical pump assembly, flexible washer fluid container, headlamp washer assembly, and a tubular hosing connecting means.

Two (2) embodiments of the invention are disclosed by applicant, i.e.: a self-contained headlamp washer system in which the headlamp washer nozzle assembly is contained within and by the headlamp bezel, and a headlamp washer nozzle assembly which is of a two-piece construction independent of the headlamp bezel, said washer nozzle assembly is capable of being either attached or clipped on to any existing headlamp bezel. In both disclosed embodiments, applicant prefers that the headlamp washer nozzle assembly be made from a molded plastic material of high strength and impact resistant characteristics.

The headlamp washer nozzle assembly is specifically designed so that no part thereof protrudes on, or covers any portion of the vehicle headlamp, and has a specially constructed long fluid passageway and washer fluid discharge apertures which allow the placement of the washer fluid over the entire surface of the vehicle headlamps in a controlled and more effective cleaning pattern.

16 Claims, 8 Drawing Figures

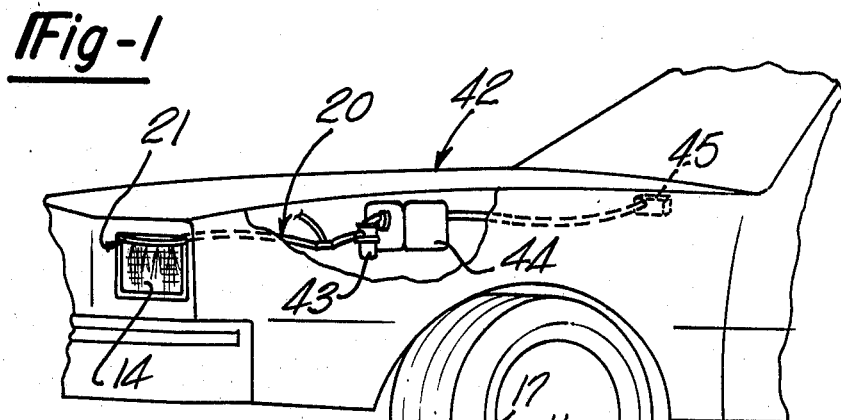
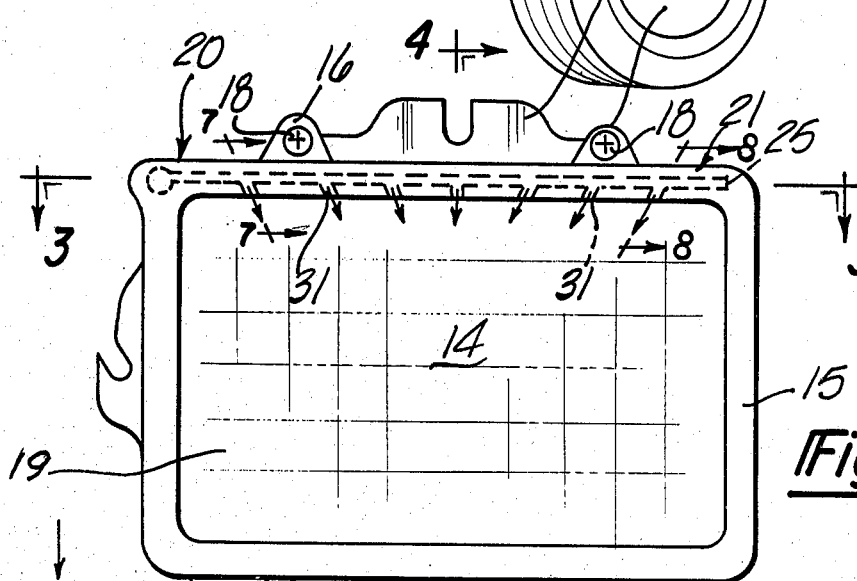
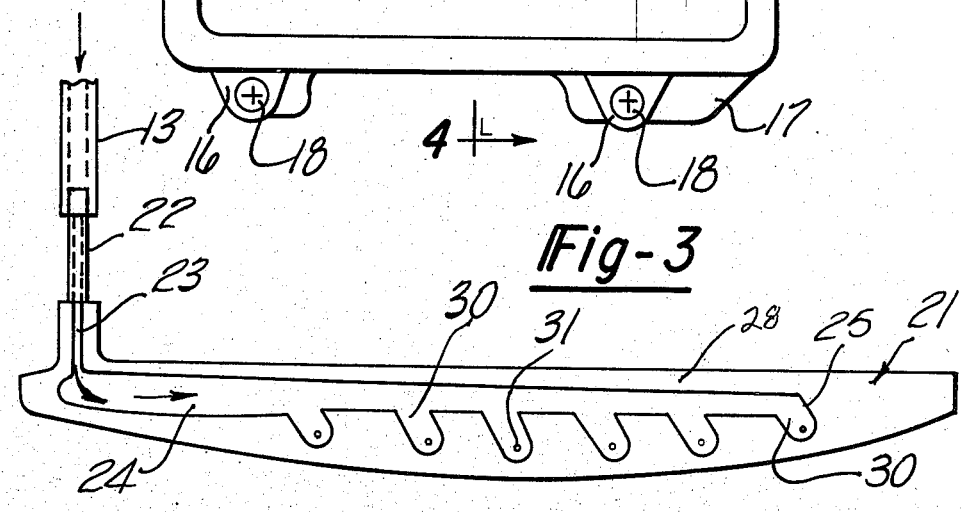

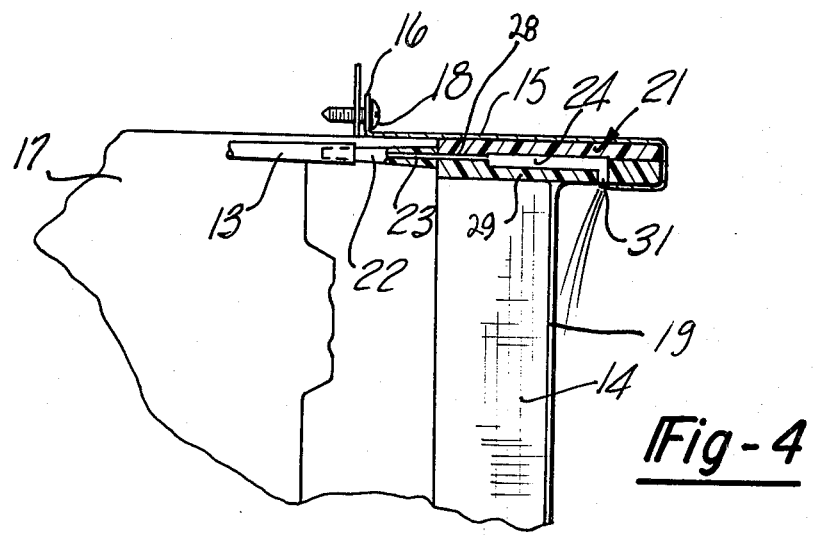
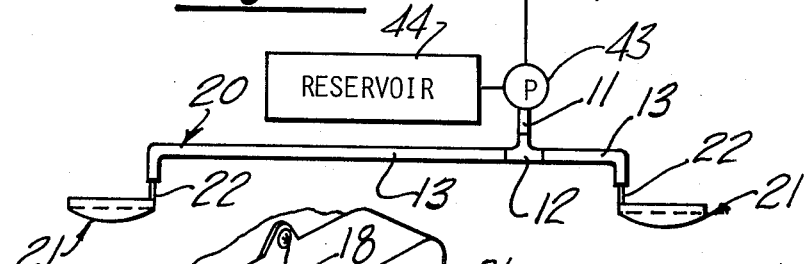
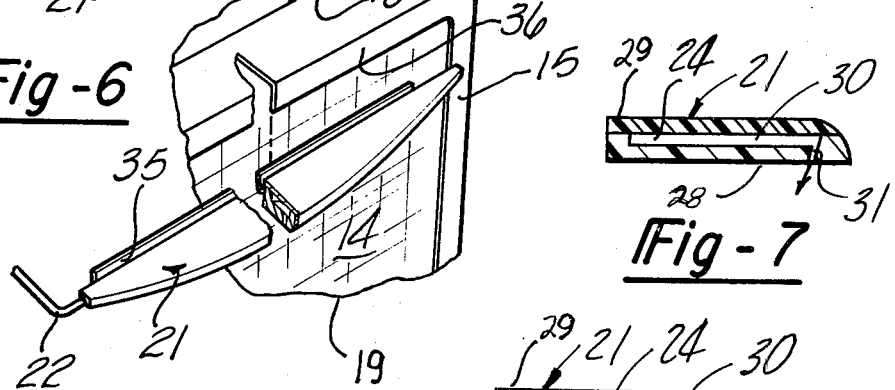
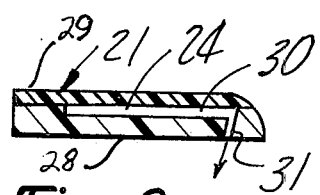

SELF-CONTAINED HEADLAMP WASHER SYSTEM

The present invention relates to a headlamp washer system, and more specifically to an improved self-contained headlamp washer system. The disclosed device answers a long felt need for an economical and effective headlamp washer system which is capable of being utilized on either new or old vehicles, and also provides a construction where none of the washer system used to clean the headlamps protrudes into the area occupied by the headlamp lens in either the integral or clip-on version of the disclosed invention. Thus, applicant has invented an improved self-contained headlamp washer system which is not only more efficient than those previously known in the art, but also complies with current Federal governmental standards prohibiting any intrusion of the area occupied by the headlamp lens by any part of the motor vehicle.

My invention is capable of delivering, under pressure, washer fluid to a plurality of headlamp surfaces so as to remove the illumination obscuring materials which accumulate on the headlamp lens during vehicle movement without obstructing in any manner the light emitted therefrom.

A review of the prior art will indicate that there are many patents which relate to the use of a headlamp washer system, but to the best of my knowledge, none of these devices have had any commercial success or acceptability by the retail consumers or the business community, nor are any of these devices in compliance with current Federal regulations relating to vehicle headlamps.

Thus, one of the objects of the present invention is to provide a self-contained headlamp washer system which is economical.

A further object of the present invention is to provide a self-contained headlamp washer system which does not protrude into the area occupied by the headlamp lens.

A further object of the present invention is to provide a self-contained headlamp washer system which has a headlamp washer nozzle assembly of two-piece construction which is retained within the headlamp bezel.

A further object of the present invention is to provide a self-contained headlamp washer system which has a headlamp washer nozzle assembly that is capable of being attached to or clipped on the headlamp bezel of any vehicle.

A further object of the present invention is to provide a self-contained headlamp washer system which complies with current vehicle headlamp safety regulations.

Another object of the present invention is to provide a headlamp washer system which is capable of being made from many different materials.

Another object of the present invention is to provide a headlamp washer system which is capable of being utilized on all shapes of vehicle headlamps.

Another object of the present invention is to provide a headlamp washer system which is of economical construction, and is capable of being easily adapted to any existing electrical windshield washer system.

Another object of the present invention is to provide a headlamp washer system which will effectively remove any dirt accumulated on a vehicle headlamp.

Still another object of the present invention is to provide a headlamp washer system which is capable of an efficient and effective delivery of a concentrated flow of washer fluid under high pressure, to a plurality of headlamp surfaces.

Still another object of the present invention is to provide a headlamp washer system which is capable of operating off its own source of washer fluid, or the washer fluid reservoir used by the windshield washer system.

Still another object of the present invention is to provide a headlamp washer system which is capable of operating either off the electrical circuit used to operate the windshield washer system of an automobile, or its own electrical source.

Further objects and advantages of this invention will be apparent from the following description and appended claims, reference being had to the accompanying drawings forming a part of this specification, wherein like reference characters designate corresponding parts in the several views.

STATEMENT OF PATENTABILITY

As part of the disclosure of the present invention, I wish to make the following "Statement of Patentability" under Rule 97 of the Patent and Trademark Office.

I did, prior to the preparation of this patent application, cause a search to be made concerning the patentability of my invention through the records of the U.S. Patent and Trademark Office.

The search of patentability was made in Class 15, subclasses 250 A, 250 R and 250.03; and Class 239, subclass 284, and the following patents were discovered:

Pollock et al. —(1964) U.S. Pat. No. 3,117,727
Edwards et al. —(1971) U.S. Pat. No. 3,574,337
Povilaitis et al. —(1972) U.S. Pat. No. 3,641,613
Wright —(1972) U.S. Pat. No. 3,658,074
Lowell —(1973) U.S. Pat. No. 3,719,819
Harkrider —(1975) U.S. Pat. No. 3,866,840
Berkelius —(1975) U.S. Pat. No. 3,893,203
Pavey —(1976) U.S. Pat. No. 3,965,522

The above prior art list of issued U.S. patents is the closest prior art of which I am aware.

Further, after a careful review of each of the above patent references which was disclosed by the search of the Patent Office records, it is my opinion that the only patent references which are material to the examination of the present invention would be the "Wright" and "Harkrider" patents, entitled respectively "Headlight Washer Apparatus" and "Vehicle Headlight De-filming Device."

It is further my opinion that although both the "Wright" and "Harkrider" patents are material to the examination of the present patent application, they do not anticipate my invention, and can easily be distinguished on the following grounds:

First, a review of the "Harkrider" patent discloses a headlight de-filming device which comprises a modified retaining ring for sealed beam headlights which includes a spray nozzle and connecting means connected to an existing window washer unit. The washer fluid is delivered as a foglike spray from the nozzle within the top of the retaining ring (bezel) to the headlight lamps when the windshield washer system is activated. The differences between my invention and the "Harkrider" device, both in construction, and function are as follows, i.e.:

The construction of the "Harkrider" device discloses the use of one single spray nozzle instead of the multiple apertures located within the washer nozzle assembly.

This construction difference makes it impossible for the "Harkrider" device to have the function and performance characteristics of my washer system.

Also, my invention can further be distinguished by the second embodiment disclosed in FIG. 6, which allows the use of a nozzle assembly which can be readily attached to the existing housing of any motor vehicle. This construction difference would allow the use and attachment of my invention to already manufactured vehicles without the necessity of replacing the bezel of the headlamp assembly, therefore making it substantially more economical to use than the "Harkrider" device.

A review of the "Wright" patent discloses a "Headlight Washer Apparatus" in a number of different embodiments. The first embodiment disclosed is capable of replacing an existing headlight retaining ring assembly by the addition of a modified integral headlight washer assembly; the second embodiment discloses an attachable washer assembly without the necessity of removing the ring assembly, and the last embodiment discloses an integral headlight retaining ring-washer assembly where the fluid connection is positioned at the back instead of the side of the "Headlight Washer Apparatus," which does away with the necessity of running a fluid line through the radiator grill work.

The "Wright" invention operates off any existing windshield washer system, and is designed to take advantage of the airstream cleaning action during the vehicle movement.

The novelty of the "Wright" invention appears to be the ease of attachment of any of the disclosed embodiments to any motor vehicle, no matter the type of windshield washer system is present, with little or no modification being necessary.

Some of the differences between my invention and the "Wright" Headlight Washer Apparatus, both in construction and function, are as follows:

First, there is a difference in the construction of the washer nozzle assembly in that my invention disclosed the use of more evenly spaced apertures which are offset from the main inlet channel of the washer nozzle assembly. This difference in construction will effect the performance and functioning of the washer system. I have found that the uniform placement of numerous apertures is preferable and will result in a more effective cleaning action, than the use of a singular, or a few aperture, washer system.

Second, my invention can further be distinguished from that of the "Wright" patent, by the fact that no part of my invention covers or protrudes on any part of the vehicle headlamp. Referring to FIGS. 1 and 2 of the "Wright" patent one will note that a substantial portion of the headlamp has been covered by the addition of the "Wright" headlight washer apparatus, which would obviously substantially reduce the night visibility by the reduction of the effective intensity of the light emitted from the headlamps.

Finally, my invention can be further distinguished from "Wright" since the "Wright" patent neither discloses nor claims the novel and unobvious design features of the special fluid passageways and apertures disposed within the headlamp washer nozzle assembly, as can be best seen by referring to FIGS. 3, 7 and 8.

It is my opinion that remaining six (6) patents which were disclosed by the search of the U.S. Patent and Trademark Office records are not material to the examination of the present invention, and for this reason I will not make any detailed statement as to each patent's relevancy as a prior art reference.

Further advantages of my invention over those disclosed in both the "Harkrider" and "Wright" patents will become apparent from the reading of the specification, with the reference to the accompanying drawings.

BRIEF DESCRIPTION OF THE DRAWINGS

FIG. 1 is a fragmentary perspective view of an automotive vehicle embodying a self-contained headlamp washer system embodying the present invention.

FIG. 2 is a front view of a construction embodying the present invention showing a self-contained headlamp washer system which is retained by the headlamp bezel.

FIG. 3 is a sectional view taken in the direction of the arrows on the section line 3—3 of FIG. 2.

FIG. 4 is a sectional view taken in the direction of the arrows on the section line 4—4 of FIG. 2.

FIG. 5 is a diagrammatic top plan view of a construction embodying the present invention.

FIG. 6 is a partial perspective view disclosing another embodiment of the present invention.

FIG. 7 is a cross-sectional view of the headlamp washer assembly taken along the lines 7—7 of FIG 2.

FIG. 8 is a cross-sectional view taken in the direction of the arrows on the section line 8—8 of FIG. 2.

It is to be understood that the present invention is not limited in its application to the details of construction and arrangements of parts illustrated in the accompanying drawings, since the invention is capable of other embodiments and of being practiced or carried out in various ways within the scope of the claims. Also, it is to be understood that the phraseology and terminology employed herein is for purpose of description and not of limitation.

DESCRIPTION OF THE PREFERRED EMBODIMENTS

Referring to FIG. 1, there is shown a perspective view of an automotive vehicle embodying my invention, which is generally designated by the numeral 20. FIG. 1 further shows an exemplary construction of my self-contained headlamp washer system 20 which consists of an electrical pump assembly 43, flexible washer fluid container 44, electrical switch 45 and headlamp washer nozzle assembly 21. As can be seen from FIG. 1, my invention, if desired, can be easily and economically connected to any standard electrical washer system known in the art.

A diagrammatic top plan view of a construction embodying my invention is disclosed in FIG. 5, where an electrical switch 45 located within the vehicle passenger compartment (not shown) is connected by suitable electrical circuitry to an electrical power source 10.

The electrical switch 45 is connected to electrical pump assembly 43 which when activated causes the electrical pump assembly 43 to draw the washer fluid (not shown) from the flexible washer fluid container 44 which communicates directly with the electrical pump assembly outlet 11 and delivers the washer fluid through the "T" connector 12 and the tubular hosing 13 to inlet 22 of the headlamp washer nozzle assembly generally designated by the numeral 21.

It can be readily seen that my invention is capable of being used to clean any number of vehicle headlamps 14, which can be of all shapes, such as rectangular, circular, square and triangular, and of any size.

It is further readily apparent that my invention as disclosed is easily adapted to any existing electrical washer system and can be used as either an independent headlamp washer system or in combination with a windshield washer system.

Referring now to FIGS. 2-4, where a preferred embodiment of my invention is disclosed, I have disclosed a front view of my present invention showing a self-contained headlamp washer system 20. The headlamp washer nozzle assembly 21 is retained by the vehicle headlamp bezel 15. The washer fluid is delivered to the washer assembly 21 through tubular hosing 13 which communicates with inlet 22 of the headlamp washer nozzle assembly 21. The washer fluid then enters through the short fluid passageway 23 which connects with the long fluid passageway 24. The passageway 24 is closed at the end 25 and has offset passageways 30 communicating with each aperture 31. The apertures 31 in the headlamp washer nozzle assembly 21 allow the controlled discharge of the washer fluid to the external surface of the vehicle headlamp 14 upon the activation of the electric pump assembly 43.

The headlamp washer nozzle assembly 21 consisting of a lower portion 28 and a cover portion 29 is specially designed so that it will effectively remove any dirt accumulated on the vehicle headlamp lens 14 by the delivery of a concentrated amount of washer fluid under high pressure to the plurality of apertures 31.

Specifically, the inlet 22 and short fluid passageway 23 are of a cylindrical cross section of a size sufficient to accommodate the standard tubular hosing 13 well known in the art.

The long fluid passageway 24 is designed so that a constant and uniform fluid pressure is maintained throughout its entire length by the constant decreasing of the cross section thereof.

This can be best seen in FIGS. 3, 7 and 8 which show the decreasing size of the long fluid passageway 24 as it approached the passageway end 25. Therefore, as the washer fluid is discharged out of each and every aperture 31, the diameter of long fluid passageway 24 is subsequently decreased to balance the decrease in available washer fluid. Also, I have found it desirable to vary the size of the apertures 31, and this can best be seen by referring to FIGS. 7 and 8 which show that the aperture 31 opening at the end of each offset passageway 30 increases in diameter as one moves in the direction of end 25 of the long fluid passageway 24.

The use of many apertures 31 which can deliver washer fluid over the entire surface of the vehicle headlamp lens 14 under a constant high and uniform pressure results in a much more effective cleaning action than was known in the prior art.

It is also to be noted that the apertures 31 are slanted inwardly towards the vehicle headlamp 14, so that the washer fluid is discharged upon the entire surface of the lens 19.

The headlamp washer nozzle assembly 21 can be easily connected to the existing housing of any vehicle, as best shown in FIG. 2, by the attachment of tabs 16 to headlamp housing 17 by suitable means well known in the art.

As can be best seen in FIG. 4, once the headlamp washer nozzle assembly is attached to the headlamp housing 17 by the bezel, no part of the assembly 21 nor the vehicle headlamp bezel 15 protrudes into the area occupied by the surface of the headlamp lens 19. Thus, I have been successful in inventing an improved self-contained headlamp washer system which complies with current vehicle safety regulations which require the lens 19 to be unobstructed.

Obviously, the use of any of the many known materials used in the automobile industry would be acceptable for construction of the nozzle 21; however, for reasons of economy and ease of manufacture, I prefer the use of any of the moldable plastics having a high strength and impact resistant characteristics, commonly known in the art. It should also be understood that the lower portion of the nozzle assembly 29 can be made together with the bezel 15.

Referring now to FIG. 6, there is shown another embodiment of my invention wherein the headlamp washer nozzle assembly 21 is not constructed to be enclosed by the vehicle headlamp bezel 15. In this particular embodiment, the headlamp washer nozzle assembly 21 can be easily installed on any vehicle by loosening of screws 18, at tabs 16, sufficiently so that the vehicle headlamp bezel 15 can be moved away from the surface of the vehicle headlamp and the longitudinal flange 35 of the assembly 21 can be placed under the horizontal flange 36 of the bezel 15. Once the longitudinal flange 35 is in position under the horizontal flange 36 of the bezel 15, screws 18 are retightened, thus holding the assembly against the vehicle headlamp 14.

Once the headlamp washer nozzle assembly 21 is secured in place, the hose 13 is attached to inlet 22 and the system is ready to operate in the same manner as the previously described embodiment.

Again, as in the previous described embodiment, the unitary headlamp washer nozzle assembly 21 is preferably made of a plastic material of high strength and impact resistant character.

In both disclosed embodiments, my self-contained headlamp washer system 20 will be actuated by the depression of electrical switch 45 which energizes the electrical pump assembly 43 and makes the washer fluid available from the washer fluid reservoir 44 through the hosing 13 to the short 23, long 24 and offset 30 fluid passageways disposed within the headlamp washer nozzle assembly 21, and out apertures 31 unto the surface of the headlamp lens 14.

Thus, by abandoning previous methods of providing headlamp washer systems, and using novel ideas which I have developed to utilize the available technology, I have provided an entirely new type of head-lamp washer system which can be installed on existing vehicles or be produced as original equipment on new vehicles.

I claim:

1. A headlamp washer system for use on a vehicle having at least one headlamp having a lens and a power source, said system including in combination a headlamp bezel for holding said headlamp and nozzle in place on said vehicle, a headlamp washer nozzle assembly at the top of said bezel and having a plurality of passageways therein, an inlet connected to said passageways, a flexible washer fluid container, an electrical pump assembly connected to said container and adapted to be operated by said power source and having an outlet, hosing connected between said pump outlet and said inlet, and an electrical switch connected to said pump assembly to operate the same, wherein the headlamp washer nozzle assembly is of a two-piece construction within the headlamp bezel and does not protude or cover any portion of the headlamp lens, the electrical pump assembly and said means for activating the same is an electrical pump assembly unit for both the headlamp washer and windshield washer systems, the flexible container is a fluid reservoir unit for both the headlamp washer and the windshield washer systems, and wherein said plurality of passageways include a long fluid passageway which decreases in cross-sectional area across the width of the nozzle.

2. The system as defined in claim 1, wherein said plurality of passageways include a plurality of apertures adapted to discharge fluid onto said lens and the diameter of each aperture of the headlamp washer nozzle assembly increases in size as the washer fluid moves towards the end of said long fluid passageway in the direction of the decrease in said cross-sectional area.

3. The system as defined in claim 2, wherein said assembly is contained within a headlamp bezel of rectangular shape.

4. The system as defined in claim 3, wherein the headlamp washer nozzle assembly is made from a molded plastic material having high strength and impact resistant characteristics.

5. A headlamp washer system for use on a vehicle having at least one headlamp having a lens and a power source, said system including in combination a headlamp bezel for holding said headlamp and nozzle in place on said vehicle, a headlamp washer nozzle assembly at the top of said bezel and having a plurality of passageways therein, an inlet connected to said passageways, a flexible washer fluid container, an electrical pump assembly connected to said container and adapted to be operated by said power source and having an outlet, hosing connected between said pump outlet and said inlet, and an electrical switch connected to said pump assembly to operate the same, wherein the headlamp washer nozzle assembly is of a two-piece construction within the headlamp bezel and does not protrude or cover any portion of the headlamp lens, the electrical pump assembly and the means for activating thereof is separate and independent of the electrical windshield washer system, the flexible washer fluid container is separate and independent of any washer fluid container unit for the windshield washer system, and wherein said plurality of passageways include a long fluid passageway which decreases in cross-sectional area across the width of said nozzle.

6. The system as defined in claim 5, wherein said plurality of passageways include a plurality of apertures adapted to discharge fluid onto said lens, and the diameter of each aperture of the headlamp washer nozzle assembly increases in size as the washer fluid moves towards the end of said long fluid passageway in the direction of the decrease in said cross-sectional area.

7. The system as defined in claim 6, wherein said assembly is deposed within a headlamp bezel of a rectangular shape.

8. The system as defined in claim 7, wherein the headlamp washer nozzle assembly is made from a molded plastic material having high strength and impact resistant characteristics.

9. A headlamp washer system for use on a vehicle having at least one headlamp having a lens and a power source, said system including in combination a headlamp bezel for holding said headlamp and nozzle in place on said vehicle, a headlamp washer nozzle assembly at the top of said bezel and having a plurality of passageways therein, an inlet connected to said passageways, a flexible washer fluid container, an electrical pump assembly connected to said container and adapted to be operated by said power source and having an outlet, hosing connected between said pump outlet and said inlet, and an electrical switch connected to said pump assembly to operate the same, wherein said headlamp washer nozzle assembly is of a unitary construction which is capable of being attached or clipped onto an existing headlamp bezel without protruding or covering any portion of the lens of said headlamp, said electrical pump assembly and said means for activating the same is an electrical pump assembly unit for both the headlamp washer and windshield washer systems, said flexible washer fluid container acting as a reservoir for both said headlamp washer and said windshield washer systems, and said plurality of passageways including a long fluid passageway which decreases in cross-sectional area across the width of said washer assembly aperture.

10. The system as defined in claim 9, wherein said plurality of passageways include a plurality of apertures adapted to discharge fluid onto said lens connected to said long passageways, and the diameter of each aperture increases towards the end of the long fluid passageway in the direction of said decreasing cross-sectional area.

11. The system as defined in claim 10, wherein said assembly is complimentary in shape and attached to a headlamp bezel of rectangular shape.

12. The system as defined in claim 11, wherein the headlamp washer nozzle assembly is made from a molded plastic material having a high strength and impact resistant characteristics.

13. A headlamp washer system for use on a vehicle having at least one headlamp having a lens and a power source, said system including in combination a headlamp bezel for holding said headlamp and nozzle in place on said vehicle, a headlamp washer nozzle assembly at the top of said bezel and having a plurality of passageways therein, an inlet connected to said passageways, a flexible washer fluid container, an electrical pump assembly power source and having an outlet, hosing connected between said pump outlet and said inlet, and an electrical switch connected to said pump assembly to operate the same, wherein said headlamp washer nozzle assembly is of a unitary construction which is capable of being attached or clipped onto an existing headlamp bezel without protruding or covering any portion of the lens of said headlamp, said electrical pump assembly and said means for activating is separate and independent of the windshield washer system, said washer fluid container also being separate and independent of any reservoir unit for the windshield washer system, and wherein said plurality of passageways include a long fluid passageway which decreases in cross-sectional area across the width of said washer assembly.

14. The system as defined in claim 13, wherein said plurality of passageways include a plurality of apertures adapted to discharge fluid onto said lens connected to said long passageways, and the diameter of each aperture increases towards the end of the long fluid passageway in the direction of said decrease in said cross-sectional area.

15. The system as defined in claim 14, wherein said assembly is complimentary in shape to and attached to a headlamp bezel of circular shape.

16. The system as defined in claim 15, wherein the headlamp washer nozzle assembly is made from a molded plastic material having a high strength and impact resistant characteristics.

* * * * *